United States Patent [19]

Pugliese et al.

[11] Patent Number: 5,004,514

[45] Date of Patent: Apr. 2, 1991

[54] METHOD OF MAKING PROTECTIVE BOOK COVERINGS

[75] Inventors: Joseph S. Pugliese, Lewisburg; Charles L. Garman, Jersey Shore, both of Pa.

[73] Assignee: Brodart Co., Williamsport, Pa.

[21] Appl. No.: 407,296

[22] Filed: Sep. 14, 1989

Related U.S. Application Data

[62] Division of Ser. No. 330,213, Mar. 29, 1989, Pat. No. 4,893,837.

[51] Int. Cl.[5] .......... B32B 31/18

[52] U.S. Cl. .......... 156/251; 156/253; 281/29; 281/31; 281/34; 281/35

[58] Field of Search .......... 156/251, 251, 253, 259, 156/271, 301, 324, 515, 530; 281/31, 35, 29, 33, 34; 206/450, 472; 493/189, 197, 200, 201, 202, 203, 204, 205, 206, 207, 208, 209; 53/555

[56] References Cited

U.S. PATENT DOCUMENTS

| | | | |
|---|---|---|---|
| 1,714,265 | 5/1929 | Gurwick | 156/271 |
| 2,525,139 | 10/1950 | Ligon | 493/203 |
| 2,735,797 | 2/1956 | Schjeldahl | 493/203 |
| 3,572,767 | 3/1971 | Learned et al. | 281/34 |
| 3,891,240 | 6/1975 | DuCorday | 281/29 |
| 4,497,508 | 2/1985 | McHugh | 281/34 |
| 4,800,110 | 1/1989 | DuCorday | 281/34 |
| 4,886,299 | 12/1989 | DuCorday | 156/251 |

*Primary Examiner*—Caleb Weston
*Attorney, Agent, or Firm*—Alan H. Levine

[57] ABSTRACT

A protective book covering including a relatively long piece of sheet material and a relatively short piece of sheet material overlying the long piece, the longitudinal edges of the two sheets being sealed together. A seal and tear line extending transverse to their longitudinal edges joins the two pieces and forms a line of severance along which the pieces can be torn to produce two units, each unit having a pocket adjacent to the seal and tear line for accommodating one of the covers of a book. One of the units has a section, extending from the pocket of that unit, long enough to wrap around the spine of the book, and be secured to the other unit. The sheet material is preferably transparent plastic. The book covering can be made in a continuous manner by providing independent lengths of relatively wide and relatively narrow plastic sheet material, and placing the lengths in face-to-face contact so that their longitudinal axes extend in the same direction. The two lengths are heated sealed together along a line parallel to their longitudinal axes but spaced form their longitudinal edges, and both lengths are heat sealed together and severed along lines transverse to their longitudinal axes. A strip of adhesive may be applied along one longitudinal edge of the wide length of material.

5 Claims, 3 Drawing Sheets

METHOD OF MAKING PROTECTIVE BOOK COVERINGS

This application is a division of application Ser. No. 330,213, filed Mar. 29, 1989, U.S. Pat. No. 4,893,837.

This invention relates to protective book coverings of the type useable with books of different thicknesses, i.e., having different numbers of pages, such a book covering being applied as two separated parts to a look after which the parts are secured together to form a unitary book covering.

Protective book coverings are known which comprise two units, each formed with a pocket. The front cover of a book to be protected can be slipped into the pocket of one of the units and the rear cover slipped into the pocket of the other unit. In some cases, one of the units has a section or flap extending from its pocket, the section being long enough to wrap around the binding of any book with which the covering will be used, and overlie part of the outer surface of the book cover other than the book cover which is accommodated within the pocket of that unit. Fastening means, usually an adhesive strip along the free edge of the flap, is used to secure the two units together after they have been applied to a book. Also, the two units may be integrally joined together, and separated along a line of severance immediately prior to being fitted on to a book.

A protective covering of this type is shown in U.S. Pat. No. 3,891,240. A problem with the covering of this patent is that it requires three separate pieces of sheet material, identified in FIG. 1 by the reference numerals 10, 16, and 18, to form the two pockets and the flap or section which extends around the book spine. Moreover, it does not appear possible to fabricate the coverings of this patent on a continuous basis.

U.S. Pat. No. 4,355,822 shows a similar book covering formed of four separate pieces of sheet material, two of the pieces being joined to form one pocketed unit and the other two pieces being joined to form the other pocketed unit. This covering also does not appear to be susceptible of manufacture on a continuous basis.

Another example of this type of book covering is shown in FIG. 7 of U.S. Pat. No. 4,497,508. The two parts of that covering are made similar to mailing envelopes. Thus, manufacture of this book covering involves folding and sealing pieces of sheet material, which is expensive and time consuming, and prevents production of the covering on a continuous basis.

As use herein, the term "continuous basis" means manufacture of protective book coverings from continuously moving lengths of sheet material which may, for example, be drawn from large rolls of the sheet material. This is to be contrasted to production on a batch basis in which one or several book coverings are made at one time, such as by a die cutting operation.

It is an object of the present invention to provide a protective book covering, of the type mentioned above, which is easy to use, and simple and inexpensive to manufacture on a continuous, mass production, basis.

It is another object of the invention to provide a method of making such book coverings on a continuous basis.

Additional objects and features of the invention will be apparent from the following description in which reference is made to the accompanying drawings.

Figure 1:
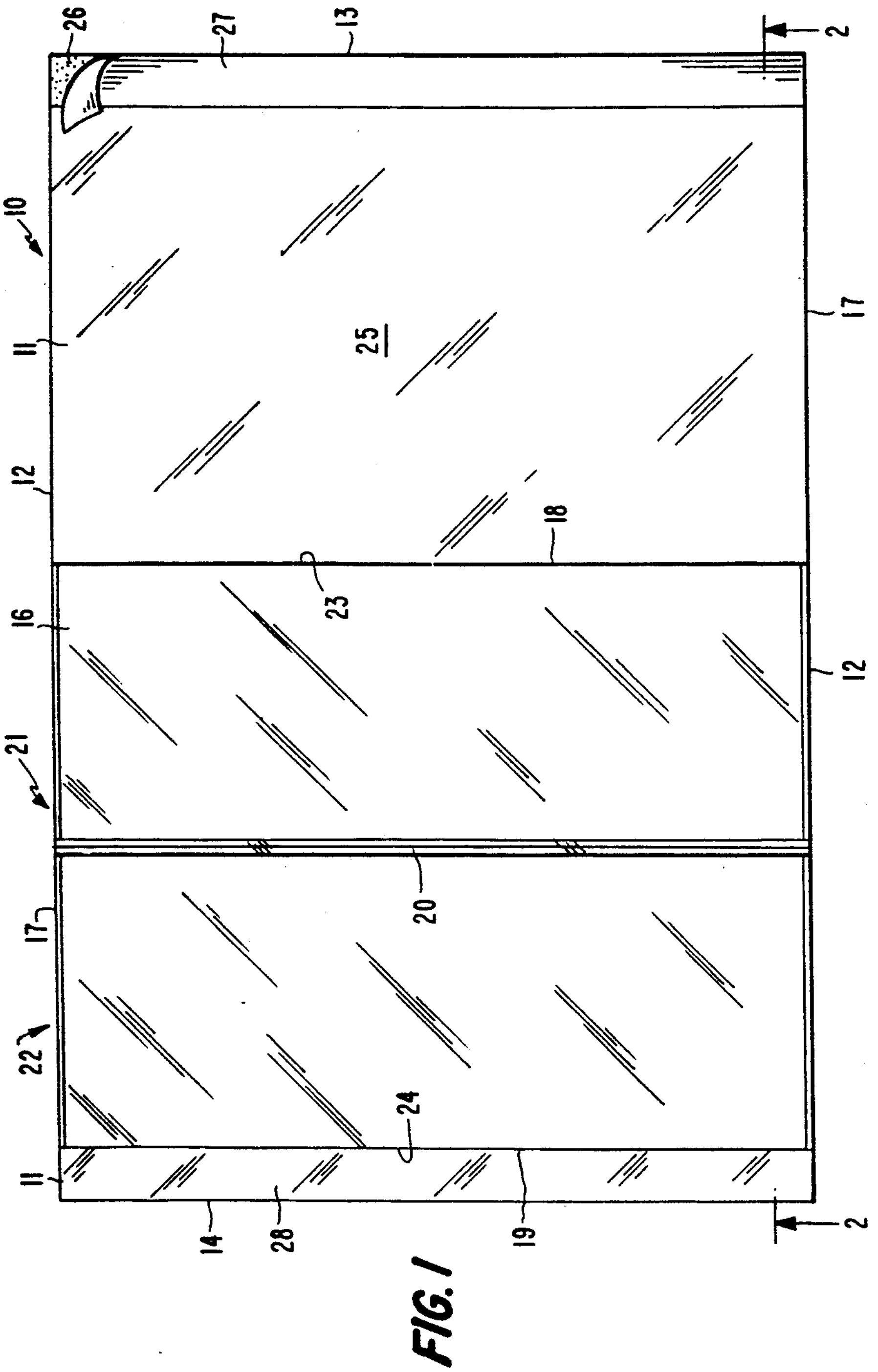
FIG. 1 is a face view of a protective book covering according to this invention, prior to being divided into two separate units.
Figure 2:
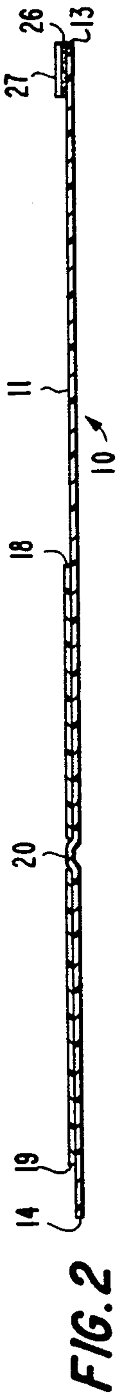
FIG. 2 is a cross-sectional view taken along line 2—2 of FIG. 1.

The protective book covering 10 chosen to illustrate the present invention, and shown in FIGS. 1 and 2, includes a relatively long piece of flexible sheet material 11 having two parallel longitudinal edges 12, and two end edges 13 and 14. Overlying piece 11 is a relatively short piece of flexible sheet material 16 having two parallel longitudinal edges 17, and two end edges 18 an 19. Preferably, both pieces of sheet material are formed of suitable plastic, such as transparent vinyl.

The longitudinal edges 12 and 17 of sheets 11 and 16, respectively, are in registry, and are heat sealed to each other to permanently join those edges together. In addition, sheets 11 and 16 are heat sealed together along a line 20, which not only welds the sheets to each other, but also weakens the material along the longitudinal central part of the seal so that line 20 also defines a line of weakness along which the sheet can be torn to produce two separate units 21 and 22 (see FIG. 4). Heat seal line 20 is spaced from both edges 18 and 19 of sheet 16, and preferably is located equidistantly from both of these edges.

As a result of the sealed-together edges 12 and 17, and the heat seal 20, the sheets define two pockets 23 and 24, each sealed along three of its edges and open along the fourth edge. The cover of a book can be slipped into each pocket.

End edges 18 and 19 of sheet 16 are spaced inwardly from end edges 13 and 14, respectively, of sheet 11 and sheet 16 is arranged much closer to edge 14 than to edge 13. As a result, unit 21 presents a section 25 extending from pocket 23 long enough to be wrapped around the spine of a book when a cover of the book is accommodated within pocket 23.

Along the margin of section 25 adjacent to edge 13, remote from pocket 23, sheet 11 is provided with a strip of adhesive 26 covered by a length protective of release paper 27.

To use the protective book covering 10, the heat-sealed-together sheets 11 an 16 are torn along the seal and tear line 20 to produce two separate units 21 and 22. Unit 21 includes pocket 23 and relatively long section 25 extending from the pocket, and unit 22 includes pocket 24 and a very short section 28 extending from the pocket.

Figure 3:
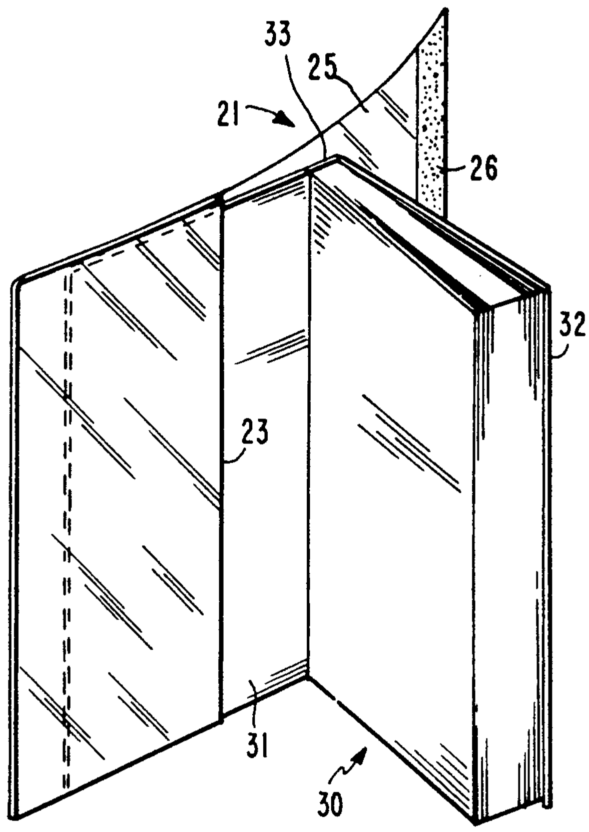
FIG. 3 is perspective view of a book after one of the separate book covering units has been applied to one cover of the book.
Figure 4:
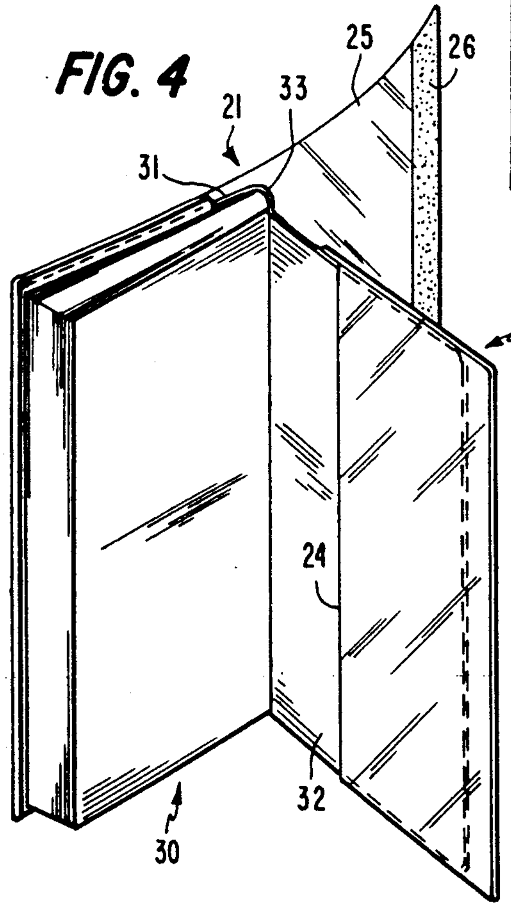
FIG. 4 is view similar to FIG. 3 after the other separate unit is applied to the other book cover.
Figure 5:
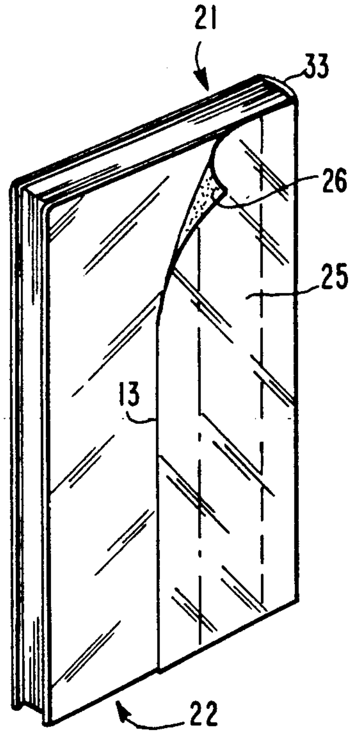
FIG. 5 is a perspective view of the book showing the book covering almost completely applied to it.

FIGS. 3-5 illustrate how units 21 and 22 are applied to a book 30. The book has a front cover 31, a back cover 32, and a spine 33 between the rear edges of the covers. The front cover 31 is slipped into pocket 23 of unit 21 (FIG. 3), and section 25 is left hanging freely. Next, the back cover 32 is slipped into pocket 24 of unit 22 (FIG. 4). Then, section 25 is wrapped snugly around the spine 33 (FIG. 5) so that it overlaps at least section 28, and possible more, of unit 22, release paper 27 is removed to expose the adhesive strip 26, and by means of the adhesive, the margin of section 25, adjacent edge 13, is secured to the outer surface of unit 22. In this way, a book is provided with a protective, clear plastic covering which fits snugly regardless of the thickness of the book.

Figure 6:
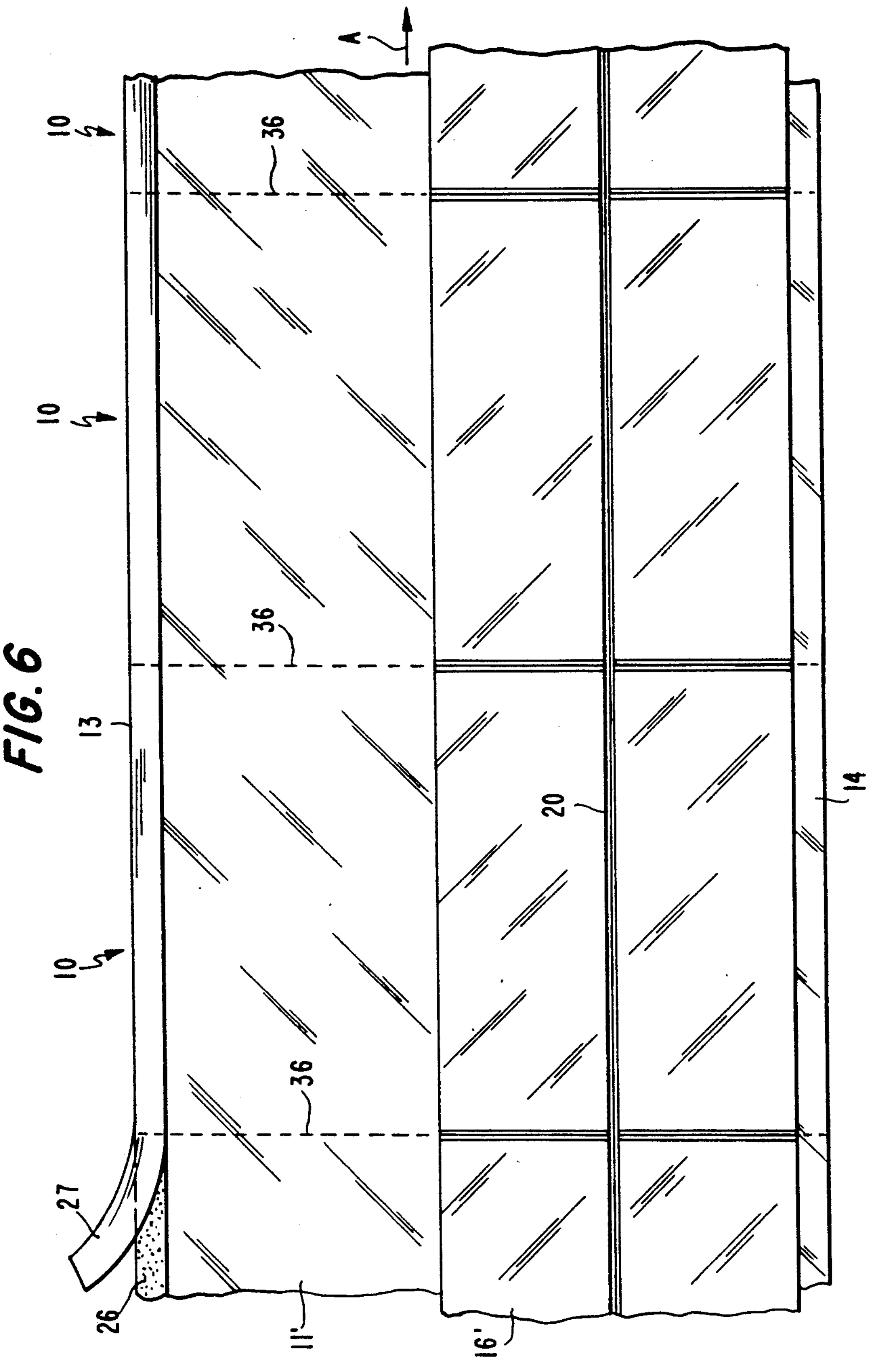
FIG. 6 is a face view of two lengths of superposed sheet material illustrating how the book coverings may be made according to the invention.

As indicated in FIG. 6, protective book covers of the present invention can be made simply, efficiently, and inexpensively on a continuous basis. A length of relatively wide plastic sheet material 11' is pulled from a supply roll (not shown), and a length of relatively narrow plastic sheet material 16' is pulled from another supply roll (not shown). The two lengths of material are brought together into contact with each other, and while they move longitudinally in the direction of arrow A, they are acted upon with suitable heat sealing means of conventional design. A heat sealing roller (not shown) continuously forms seal line 20, which seals the sheets 11' an 16' to each other and also produces a line of weakness along which the sealed-together sheet may be torn leaving a self-sustaining heat seal on each side of the tear line.

At the same time, transverse seal and severance lines 36 are produced at longitudinally spaced apart locations on the sheets 11' and 16'. Lines 36 serve to sever the sheets to produce the longitudinal edges 12 and 17 of the individual book coverings 10 (FIG. 1), as well as to heat seal together the sheets 11' and 16' in the region where they are superposed. It will be noted that the width of sheet material 11' and 16' becomes the length of individual pieces 11 and 16 which comprise book covering 10. As the sheet material 11' and 16' move longitudinally, adhesive 26 is continuously applied to the margin along edge 13, and release paper 27 is continuously fed from a supply roll (not shown) to cover the adhesive.

Thus, it will be appreciated that with the use of just two supplies of plastic sheet material, and continuous heat sealing, while the sheet material moves longitudinally, individual protective book covers are formed on a continuous basis.

The invention has been shown an described in preferred form only, and by way of example, and many variations may be made in the invention which will still be comprised within its spirit. It is understood, therefore, that the invention is not limited to any specific form or embodiment except insofar as such limitations are included in the appended claims.

We claim:

1. A method of making protective book coverings, comprising the steps of:

providing a length of relatively wide plastic sheet material having two parallel longitudinal edges, providing a length of relatively narrow plastic sheet material having two parallel longitudinal edges, placing a face of the narrow length of material against a face of the wide length of material with the longitudinal edges of both lengths parallel to one another, the narrow material being closer to one of the longitudinal edges of the wide material than to the other, heat sealing the two lengths of material together along a line parallel to the longitudinal edges of the material, the heat seal line being spaced from both longitudinal edges of the narrow length of material, and the heat seal line weakening the two lengths of material so that they can be torn along that line, and heating and severing both lengths of material along lines transverse to the longitudinal edges thereof, the heat serving to seal together the two lengths of material along said transverse lines, and the severing serving to produce individual book coverings, each covering having two pockets, for accommodating the front and rear covers of a book, and a section extending from one of the pockets long enough to wrap around the spine of a book when a book cover is placed within that pocket.

2. A method as defined in claim 1 wherein the narrow material is located in its entirety between the longitudinal edges of the wide material.

3. A method as defined in claim 1 wherein the parallel seal line is equidistantly spaced from both longitudinal edges of the narrow material.

4. A method of making a protective book covering, comprising the steps of:

providing a length of relatively wide plastic sheet material having two parallel longitudinal edges, providing a length of relatively narrow plastic sheet material having two parallel longitudinal edges, placing a face of the narrow length of material against a face of the wide length of material with the longitudinal edges of both lengths parallel to one another, applying a strip of adhesive to the wide material alongside one longitudinal edge thereof, heat sealing the two lengths of material together along a line parallel to the longitudinal edges of the material, the heat seal line being spaced from both longitudinal edges of the narrow length of material, and heating and severing both lengths of material along lines transverse to the longitudinal edges thereof, the heat serving to seal together the two lengths of material along said transverse lines.

5. A method of making a protective book covering, comprising the steps of:

providing a length of relatively wide plastic sheet material having two parallel longitudinal edges, providing a length of relatively narrow plastic sheet material having two parallel longitudinal edges, placing a face of the narrow length of material against a face of the wide length of material with the longitudinal edges of both lengths parallel to one another, the narrow material being closer to one of the longitudinal edges of the wide material than the other, applying a strip of adhesive to the wide material alongside the longitudinal edge thereof which is more remote from the narrow material, heat sealing the two lengths of material together along a line parallel to the longitudinal edges of the material, the heat seal line being spaced from both longitudinal edges of the narrow length of material, and heating and severing both lengths of material along lines transverse to the longitudinal edges thereof, the heat serving to seal together the two lengths of material along said transverse lines.

* * * * *